(12) United States Patent
Ren et al.

(10) Patent No.: US 10,401,933 B2
(45) Date of Patent: Sep. 3, 2019

(54) APPROACH FOR END-TO-END POWER EFFICIENCY MODELING FOR DATA CENTERS

(71) Applicant: Futurewei Technologies, Inc., Plano, TX (US)

(72) Inventors: Da Qi Ren, Santa Clara, CA (US); Zhulin Wei, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 244 days.

(21) Appl. No.: 14/870,856

(22) Filed: Sep. 30, 2015

(65) Prior Publication Data

US 2017/0090541 A1     Mar. 30, 2017

(51) Int. Cl.
  *G06F 1/28*      (2006.01)
  *G06F 9/50*      (2006.01)
  *G06F 1/26*      (2006.01)
  *G06F 1/3203*    (2019.01)

(52) U.S. Cl.
  CPC .............. *G06F 1/28* (2013.01); *G06F 1/26* (2013.01); *G06F 1/3203* (2013.01); *G06F 9/5083* (2013.01); *G06F 9/5094* (2013.01); *Y02D 10/22* (2018.01)

(58) Field of Classification Search
  CPC . G06F 1/28; G06F 9/5083; G06F 1/26; G06F 1/3203; G06F 9/5094; Y02B 60/142; Y02B 60/167; Y02D 10/22
  See application file for complete search history.

(56) References Cited

U.S. PATENT DOCUMENTS

| 7,243,243 B2 * | 7/2007 | Gedeon ................. G06F 1/3203 713/300 |
| 8,214,843 B2 * | 7/2012 | Boss ..................... G06F 9/5094 718/104 |
| 9,264,911 B2 * | 2/2016 | Lee .................... H04W 52/0251 |
| 2002/0057297 A1 * | 5/2002 | Grimes ............ G06F 17/30867 715/810 |
| 2004/0044914 A1 | 3/2004 | Gedeon |

(Continued)

FOREIGN PATENT DOCUMENTS

| CN | 103778020 A     | 5/2014 |
| WO | 2011011452 A2   | 1/2011 |
| WO | 2015106039 A1   | 7/2015 |

OTHER PUBLICATIONS

Machine Translation and Abstract of Chinese Publication No. CN103778020, May 7, 2014, 11 pages.

(Continued)

*Primary Examiner* — Fahmida Rahman
(74) *Attorney, Agent, or Firm* — Conley Rose, P.C.

(57) ABSTRACT

An apparatus comprising a receiver configured to receive a plurality of power measurements from a plurality of power sensors, and a processor coupled to the receiver and configured to determine an amount of power used by a processing element in a data center by determining a summation of the plurality of power measurements, determine a data to Watt ratio that indicates an amount of data that may be processed by the processing element per unit of power used, determine an estimated execution time for processing the amount of data by the processing element, and determine an estimated energy consumption that indicates an amount of energy to be used by the processing element to process the amount of data.

20 Claims, 10 Drawing Sheets

(56) References Cited

U.S. PATENT DOCUMENTS

| | | | |
|---|---|---|---|
| 2009/0210752 A1* | 8/2009 | Bartik | G06F 11/3466 |
| | | | 714/47.1 |
| 2010/0049494 A1 | 2/2010 | Radibratovic et al. | |
| 2011/0072293 A1 | 3/2011 | Mazzaferri et al. | |
| 2012/0081373 A1* | 4/2012 | Li | G06F 9/4893 |
| | | | 345/520 |
| 2012/0232879 A1 | 9/2012 | Iyengar et al. | |
| 2015/0006918 A1* | 1/2015 | Page | G06F 1/26 |
| | | | 713/300 |
| 2015/0227397 A1* | 8/2015 | Gogula | G06F 9/5094 |
| | | | 718/104 |

OTHER PUBLICATIONS

Wang, S., et al., "Particle Swarm Optimization for Energy-Aware Virtual Machine Placement Optimization in Virtualized Data Centers," International Conference on Parallel and Distributed Systems, 2013, pp. 102-109.

Foreign Communication From A Counterpart Application, PCT Application No. PCT/CN2016/099346, International Search Report dated Dec. 12, 2016, 4 pages.

Tou, et la., "Pattern Recognition Principles," London-Amsterdam-Dom Mills, Ontario-Sydney-Tokyo. Addison-Wesley Publishing Company. 1974. Article first published online: Nov. 22, 2006, DOI: 10.1002/zamm.19770570626 Copyright © 1977 Wiley-VCH Verlag GmbH & Co. KGaA, Weinheim.

Foreign Communication From A Counterpart Application, European Application No. 16850283.9, Partial Supplementary European Search Report dated Aug. 24, 2018, 15 pages.

Foreign Communication From A Counterpart Application, European Application No. 16850283.9, Extended European Search Report dated Dec. 6, 2018, 16 pages.

\* cited by examiner

APPROACH FOR END-TO-END POWER EFFICIENCY MODELING FOR DATA CENTERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As common data storage and computation practices transition to cloud-based and data center centralized approaches, an amount of computation and processes performed by data centers, particularly on large quantities of data, increases rapidly. With increased computation and processes, power usage, and thereby cost, also increases. Therefore, as more computations and processes are performed in data centers, it may be desirable to develop an efficient means for estimating energy usage and increasing efficiency.

SUMMARY

In one embodiment, the disclosure includes an apparatus comprising a receiver configured to receive a plurality of power measurements from a plurality of power sensors, and a processor coupled to the receiver and configured to determine an amount of power used by a processing element in a data center by determining a summation of the plurality of power measurements, determine a data to Watt ratio that indicates an amount of data that may be processed by the processing element per unit of power used, determine an estimated execution time for processing the amount of data by the processing element, and determine an estimated energy consumption that indicates an amount of energy to be used by the processing element to process the amount of data.

In another embodiment, the disclosure includes a method for tuning performance of a processing element for handling a data flow, comprising controlling a behavior of low-level code of a program executing on the processing element, abstracting and modeling the behavior of the program for analysis and study, determining an estimate of energy used by the processing element in performing computational tasks, determining an overall power model for a multiprocessing platform, determining computational capacity of a parallel processing device, optimizing coding strategies according to the overall power model, and tuning the processing element to increase a power efficiency level of the processing element.

In yet another embodiment, the disclosure includes a method of modeling energy usage in a processing element, comprising performing a plurality of power measurements of a plurality of components of the processing element located in a data center, determining an average power usage according to the plurality of power measurements, determining an estimated execution time for the processing element performing at least one action on a data flow, and determining an estimated value of energy consumption according to the average power usage and the estimated execution time.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an embodiment of an approach for estimating energy consumption in a data center. By taking measurements of power used by computing devices in a data center, an average power usage may be determined. Using known values of the data that was processed as that power was used, an estimation of energy used by the data center and a ration of data processed per unit of power is determined. Combining the determined values, a level of efficiency in the data center is increased, in various embodiments, though domain partitioning, load parallelization, dynamic frequency scaling, and/or workload scheduling.

Figure 1:
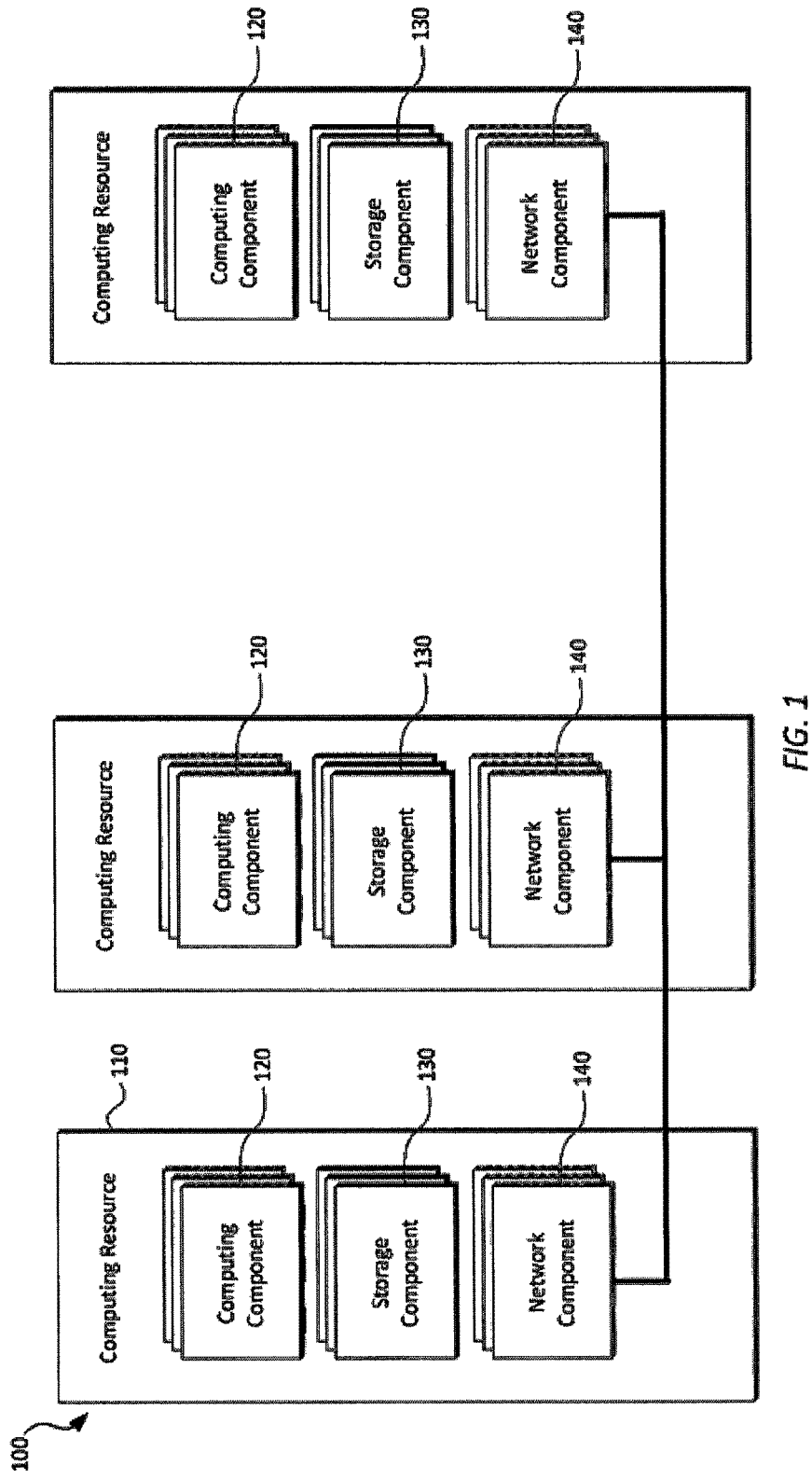
FIG. 1 is a schematic diagram of an embodiment of a data center.

FIG. 1 is a schematic diagram of an embodiment of a data center 100. Data center 100 comprises a plurality of interconnected computing resources (e.g., servers) 110 that each comprise at least one computing component 120, at least one storage component 130, and at least one network component 140. In one embodiment, the computing component 120 comprises a plurality of central processing units connected to a controller, the storage component 130 comprises a plurality of storage modules (e.g., dynamic random access memory modules and/or other non-volatile memory modules) connected to another controller, and the network component 140 comprises a plurality of network interfaces (e.g., peripheral component interconnect express interfaces and/or other interfaces capable of networking with other computing resources). In some embodiments, each computing resource 110 may further comprise additional components as needed in combination with, or in place of, computing component 120, storage component 130, and network component 140.

To determine a quantity power used by the plurality of computing resources 110 in the data center 100, in one embodiment, an array of sensors is connected to the computing resources 110. For example, an array of power sensors and/or power meters may be connected to the computing resources 110 such that a power sensor is connected to each computing component 120, a power sensor is connected to each storage component 130, and a power sensor is connected to each network component 140 in each computing resource 110. In various embodiments, the power sensors may be connected to provide power usage information at a device level, at an electronic circuit board level, at an integrated circuit level, and/or at any other level or division for which power usage information is desired. Power data obtained by the power sensors is then used to determine a total power usage for the data center 100. For example, the total power usage measured in Watts (W) is captured by determining a summation of power used by all computing components 120 in the data center 100, a summation of power used by all storage components 130 in the data center 100, and a power used by networking in the data center 100 according to $P(w) = \sum_{i=1}^{N} P_{Compute}^{i}(w^i) + \sum_{j=1}^{M} P_{Storage}^{j}(w^j) + P_{network}(w)$ in which P(w) is the total power consumed by the computing resources 110, N is the number of computing components 120, M is the number of storage components 130, and for a given device i at a time k, where a measurement of voltage is $U_i^{(k)}$ and a measurement of current is $I_i^{(k)}$, the power of the device i at time k is $P_i^{(k)}$, such that $P_i^{(k)} = U_i^{(k)} I_i^{(k)}$. The power results of each sampling period k may be plotted together to obtain a power chart for the computing resource 110 that shows the power usage against time during execution of computations on the computing resource 110.

For each computing resource 110 or component thereof (e.g., computing component 120, storage component 130, and/or network component 140), a calculation to determine energy used is $E = \int_0^T P(t)dt$, where $T$ is an elapsed time for a computational run by the computing resource 110, P(t) is the power measured at time t, and dt represents the differential of t. When a sampling interval of the power sensor is small enough, a sample period s is an approximation of dt. As stated above, at a given point in time k, the power $$P(k) = \sum_{1 \le k \le m} P_i^{(k)}.$$

Therefore, the energy calculation takes the form of $$E = \sum_0^T P^{(k)} k.$$

Figure 2:
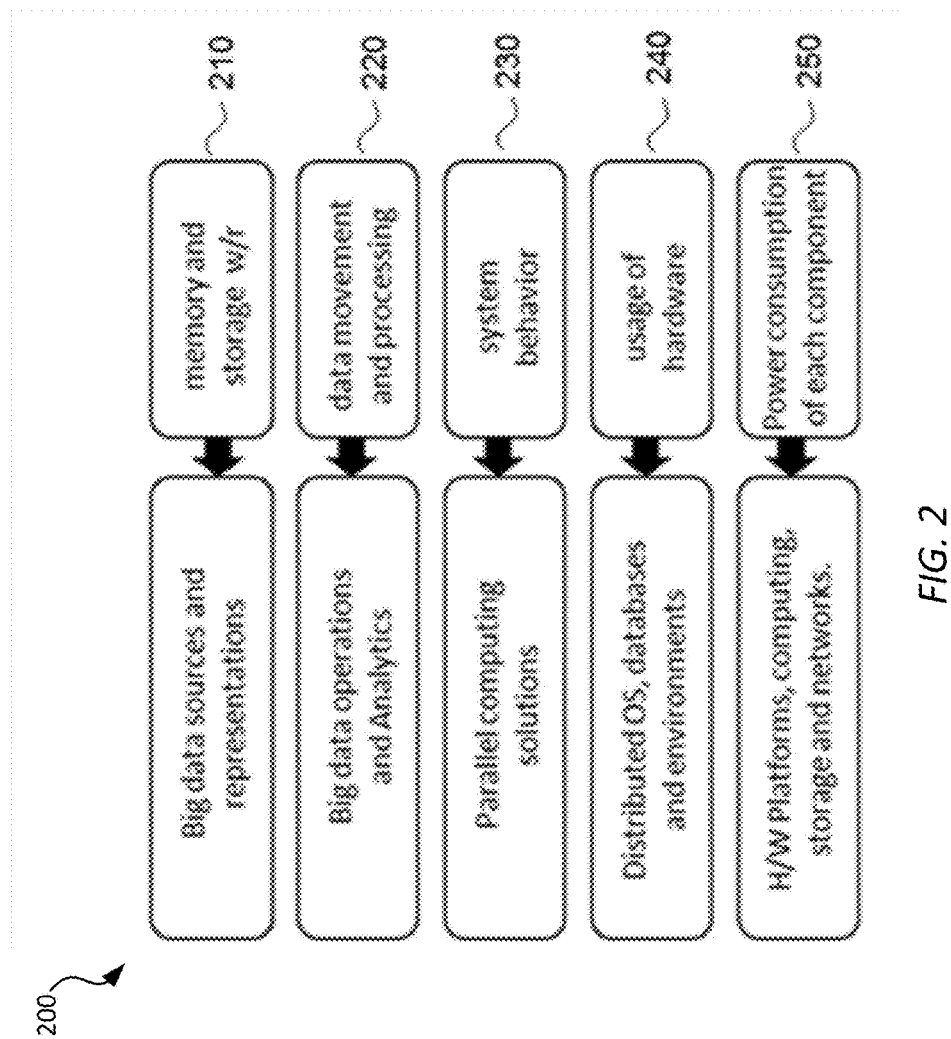
FIG. 2 is a schematic diagram of an embodiment of a data flow model.

FIG. 2 is a schematic diagram of an embodiment of a data flow model 200. Model 200 facilitates the modeling of a data flow in large data applications and/or architecture of a data center for quantitative analyzing of energy consumption. In some embodiments, model 200 may be referred to as an end-to-end and/or a top to bottom model and may be implemented in a data center (e.g., data center 100, shown in FIG. 1) to model a data flow for use in forming an energy estimation according to the present disclosure. To model the data flow, model 200 has an awareness of a hardware architecture (e.g., an overall hardware architecture of computing resource 110, shown in FIG. 1, or an architecture of its subcomponents 120-140) in the data center, as well as specific parameters and/or characteristics of the hardware. Model 200 comprises a plurality of components, each that models a portion of a data flow. Component 210 models write and read (e.g., input and output) characteristics for big data sources. Component 220 models movements and processes when big data operations and analytics perform. Component 230 abstracts detailed behavior for data flow of hardware architectures. Utilizing its awareness of the hardware architecture, component 240 determines one or more characteristics of a workload under which the hardware architecture is operating to handle the data flow. Component 250 determines an evaluation of energy consumed in the data flow, a platform and/or environment to be used for the model 200, and information for predicting the power-efficiency of the data flow.

Figure 3:
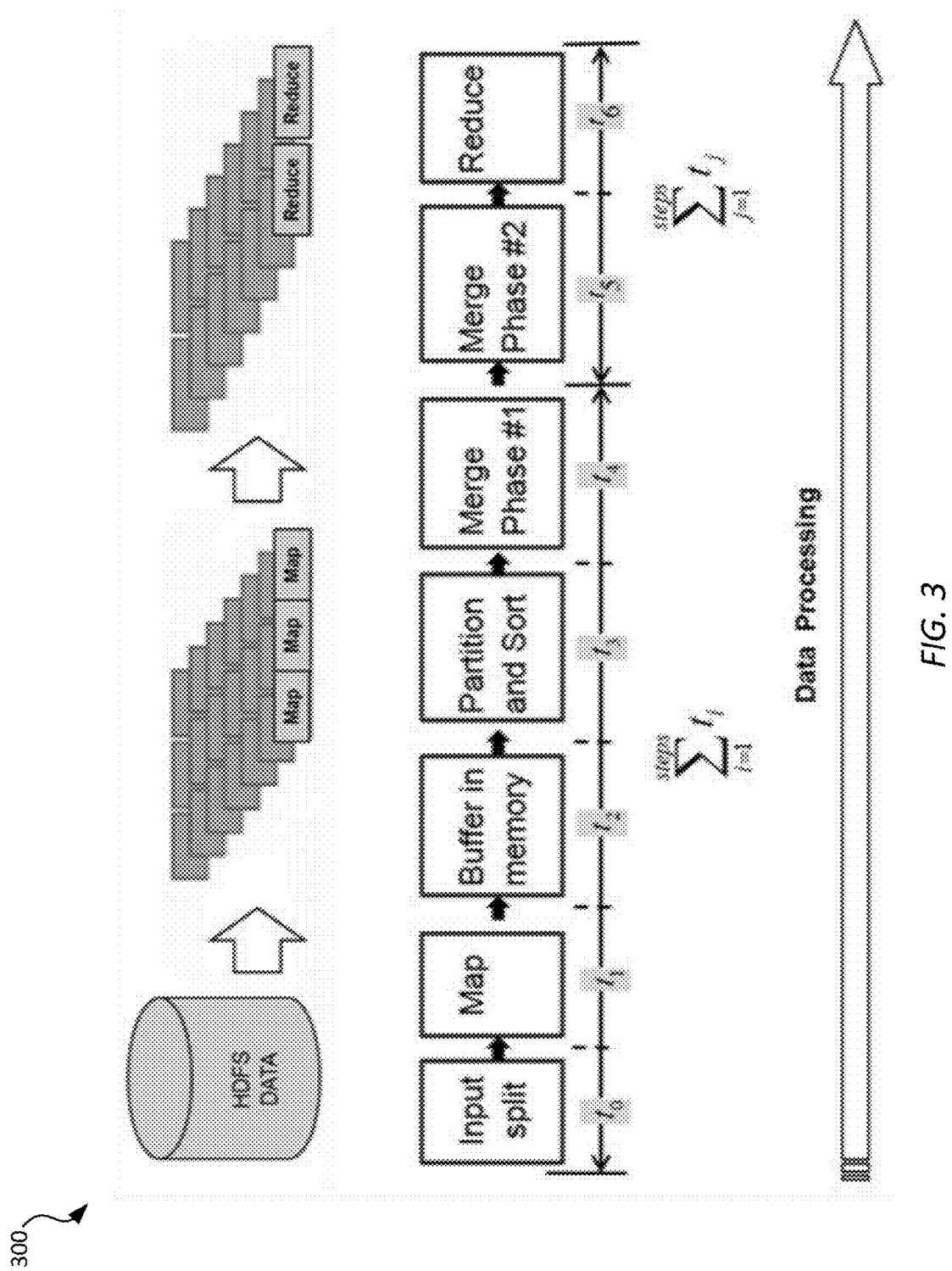
FIG. 3 is a schematic diagram of an embodiment of a method for determining performance in a data flow.

FIG. 3 is a schematic diagram of an embodiment of a method 300 for determining performance in a data flow. Method 300 is implemented, in some embodiments, in a data center such as data center 100, shown in FIG. 1, to determine characteristics of performance in a data flow (e.g., to determine an amount of time consumed in processing data) for use in forming an energy estimation according to the present disclosure. In one embodiment, method 300 illustrates one implementation of a method (e.g., MapReduce) for processing large data sets, sometimes known as big data. The MapReduce method may be implemented in a parallel, distributed computing environment (e.g., a computing cluster). Generally, a MapReduce method performs a transformation by way of a map step, and performs an aggregation by way of a reduce step. The MapReduce method implements further steps between the map step and the reduce step that aid in the MapReduce method by ensuring that values undergoing processing according to the MapReduce method are properly grouped together and ready for the reduce step. By determining an amount of time required for a given step in the method 300 to complete, a performance value for the data flow may be determined. For example, in the embodiment of method 300 that comprises a MapReduce method, a data flow may include a mapping stage that comprises a plurality of discrete steps and a reducing stage that comprises another plurality of discrete steps. For example, the map stage may comprise an input splitting step, the map step, a buffering step, a partitioning and sorting step, and a first merging step. For each of the steps in the mapping stage, a time t is determined such that a summation $\sum_{i=1}^{steps} t_i$, where i is the step the mapping stage being measured and steps is the number of steps in the particular stage of the data flow, of the time used to complete the mapping stage is determined. Similarly, for each of the steps in the reducing stage, a time t is determined such that a summation $\sum_{j=1}^{steps} t_j$, where j is the step of the reducing stage being measured and steps is the number of steps in the particular stage of the data flow, of the time used to complete the reducing stage is determined. A total time consumed for processing the big data according to method 300 may be determined by adding the determined sums of the mapping stage and the reducing stage. Alternatively, in some embodiments, the steps of method 300 may not be grouped into stages. In such embodiments, the total time consumed for processing the big data may be determined by performing a single summation of times required for each step of method 300 to complete.

Figure 4:
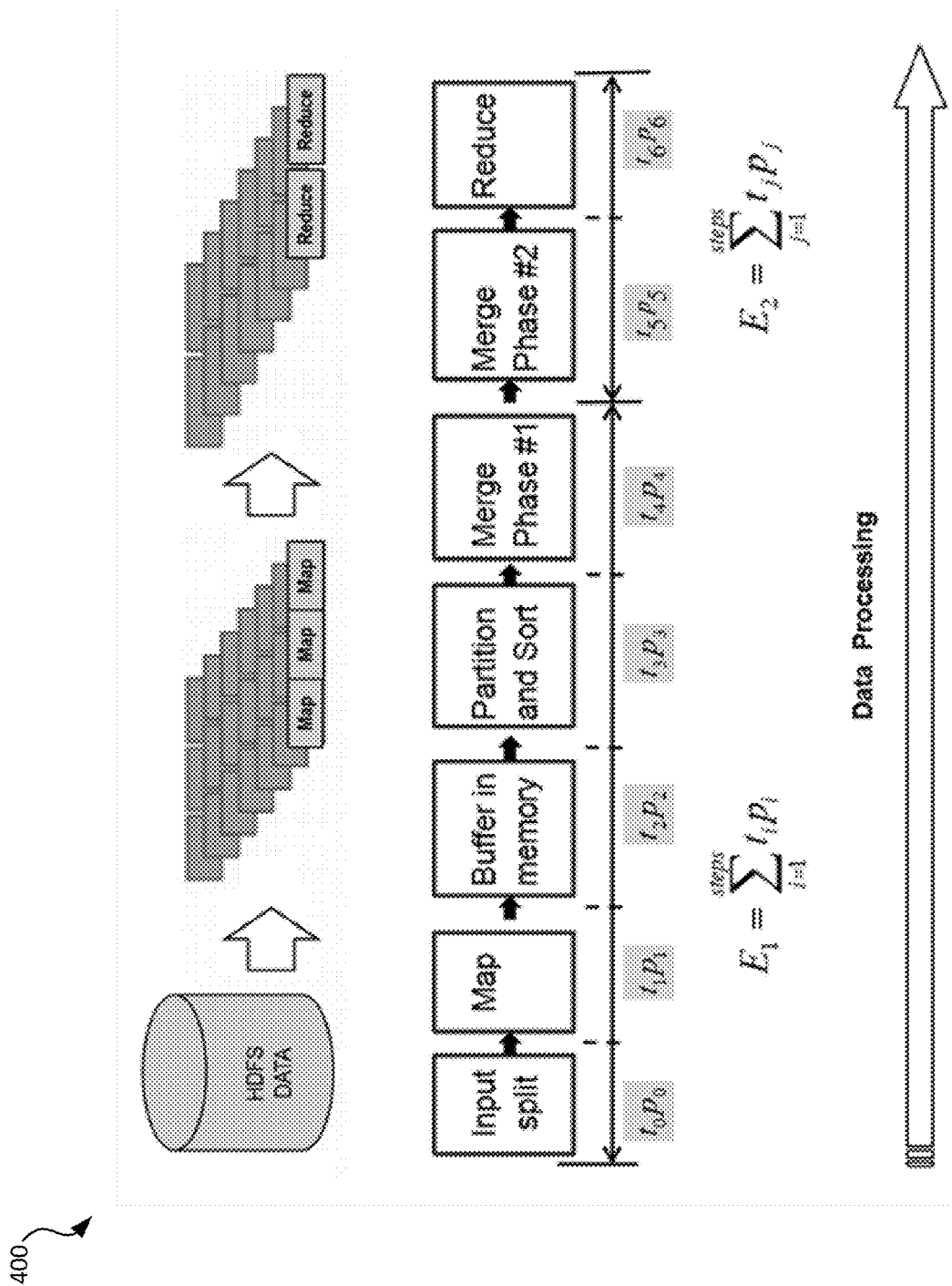
FIG. 4 is a schematic diagram of an embodiment of a method for determining energy used in a data flow.

FIG. 4 is a schematic diagram of an embodiment of a method 400 for determining energy used in a data flow. In one embodiment, method 400 illustrates the MapReduce method of method 300 for determining other characteristics of performance in a data flow (e.g., determining an amount of energy consumed in processing data) for use in forming an energy estimation according to the present disclosure. By determining an amount of time required for a given step in a data flow to complete, as well as an amount of power used to complete that step, an amount of energy used in processing the data flow may be determined. The amount of energy may be determined by, for example, determining an amount of power consumed according to a result of a power analyzer, determining an amount of time consumed, and determining according to the power consumed and the time consumed, an amount of energy used. For example, as in method 300 of FIG. 3, a data flow may include a mapping stage that comprises a plurality of discrete steps and a reducing stage that comprises another plurality of discrete steps. For each of the steps in the mapping stage, energy used in completing the step may be found by determining an amount of time t taken to complete the step and an amount of power p used to complete the step such that a summation $\Sigma_{i=1}^{steps} t_i p_i$, where i is the step of the mapping stage being measured and steps is the number of steps in the particular stage of the data flow, determines the energy used to complete the mapping stage. Similarly, for each of the steps in the reducing stage, energy used in completing the step may be found by determining an amount of time t taken to complete the step and an amount of power p used to complete the step such that a summation $\Sigma_{j=1}^{steps} t_j p_j$, where j is the step of the reducing stage being measured and steps is the number of steps in the particular stage of the data flow, determines the energy used to complete the reducing stage. Utilizing the determined amounts of energy used, a total amount of energy used by the data flow may be determined by $E_{total} = \Sigma_{k=1}^{stages} E_k$, where k is the stage of the data flow being measured and stages is the number of stages being measured in the data flow. Alternatively, in some embodiments, the steps of method 400 may not be grouped into stages. In such embodiments, the total energy used for processing the big data may be determined by performing a single summation of determined energy values required for each step of method 400.

Figure 5:
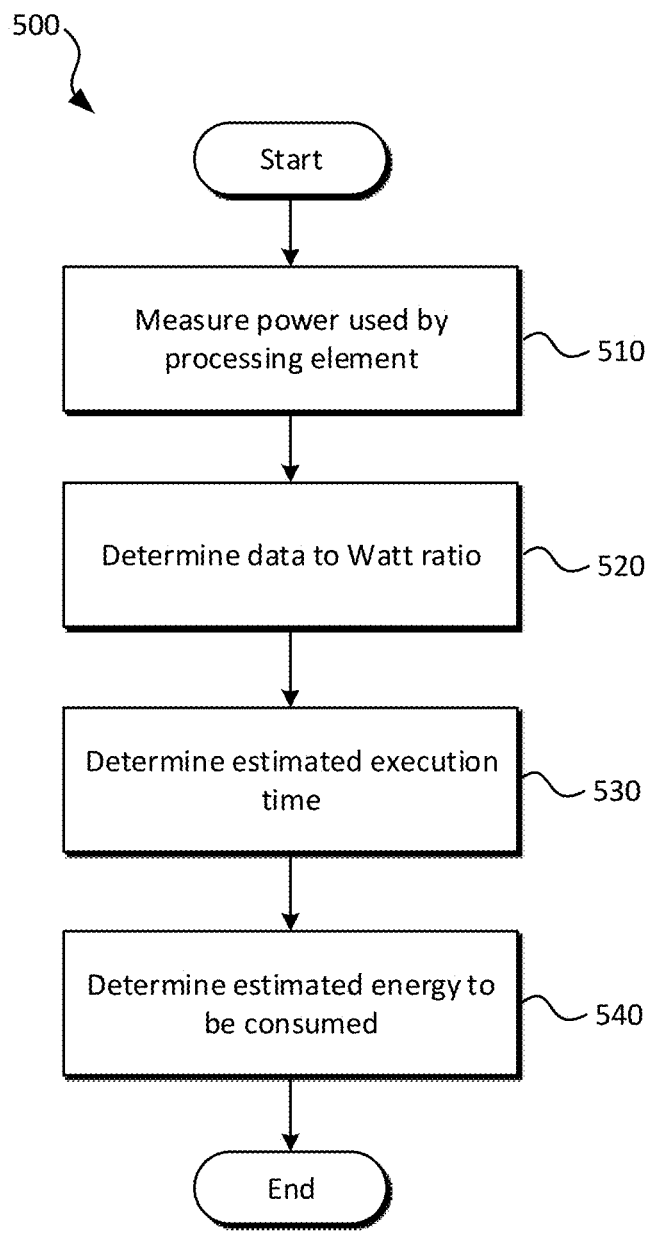
FIG. 5 is a flowchart of an embodiment of an energy estimation modeling method.

FIG. 5 is a flowchart of an embodiment of an energy estimation modeling method 500. Method 500 may be implemented, for example, to determine an estimate of an amount of energy that will be consumed by one or more processing elements in a data center in processing big data prior to processing the big data so that a cost of processing the big data may be determined. In one embodiment, method 500 is implemented in a data center (e.g., data center 100, shown in FIG. 1) to estimate an amount of energy that will be used by a processing element (e.g., one of the computing resources 110, shown in FIG. 2) in performing one or more actions on data in the data center. At step 510, a measurement of power used by each component of the processing element (e.g., a central processing unit (CPU), a hard disk drive, and/or a main circuit board and memory) is made and converted into an average value. For example, the power measurements may be taken by an array of power sensors and/or power analyzers coupled to the processing element (e.g., as shown and discussed with respect to computing resources 110, shown in FIG. 1). In one embodiment, the processing element comprises a plurality of complementary metal-oxide semiconductor (CMOS) elements. A power usage value for each of the CMOS elements may be determined according to Power=DynamicPower+ShortCircuitPower+LeakagePower, where the DynamicPower is the power consumed during actual data processing by the CMOS element, the ShortCircuitPower is the momentary power used that flows between the supply voltage and ground in the CMOS element, and the LeakagePower is the power used due to current leakage in the CMOS element. The DynamicPower, or power resulting from the CMOS element processing data, may be further defined as $P=ACV^2 f$, where A is the active fraction of the gates in the CMOS element that are switching each clock cycle, C is the total capacitance driven by all the gate outputs in the CMOS element (thereby making AC the capacitance being switched per clock cycles), V is the operating voltage of the CMOS element, and f is the frequency of the clock.

At step 520, a data to Watt ratio is determined that indicates an amount of data throughput that may be processed by the processing element for a given amount of power consumed. In some embodiments, a processing element performs operations on big data in a streaming manner (e.g., Terasort or K-means clustering). In such embodiments, each operation or step (e.g., step of method 300 or 400, shown above in FIGS. 3 and 4, respectively) that takes place on identical processing element hardware components will consume an approximately identical amount of power. As a result, power may be approximated as a constant in these embodiments and lead to a determination of the data to Watt ratio (e.g., how much data may be processed by the processing element for a given amount of power). To determine the data to Watt ratio, an amount of data being processed by the processing element, an amount of time consumed by the processing element to process the data, and an amount of power used by the processing element to process the data are determined.

At step 530, an estimated execution time is determined by dividing a total workload (e.g., an amount of data on which actions are to be performed) that is to be computed by the processing element by a maximum data throughput of the processing element. For example, for a workload of 100 gigabytes being processed by a processing element with a throughput of 10 gigabytes per second, the estimated execution time would be determined as 10 seconds. At step 540, an estimated amount of energy to be consumed in completing the actions on the data is determined by multiplying the average power determined in step 510 by the estimated execution time determined in step 530.

Using the estimated execution time and the estimated energy, the data to Watt ratio may be determined. Because the power used by a processing element is only dependent on a number of operations performed in a given time, and the computational capacity of the processing element is also determined according to the number of operations performed in the given time, an amount of energy that will be consumed by the processing element in processing any proposed amount of data can be determined according to the above methods 300, 400, and 500 prior to processing the data.

It is assumed in method 500 that hardware components of the processing element are unchanged as data is processed in the processing element, that data passes through the processing element with a consistent speed, that resources of the processing element are not shared with any other task while processing the data, and that operating temperatures of the processing element and all of its components remain at an acceptable level as determined by the specifications of the respective components.

Figure 6:
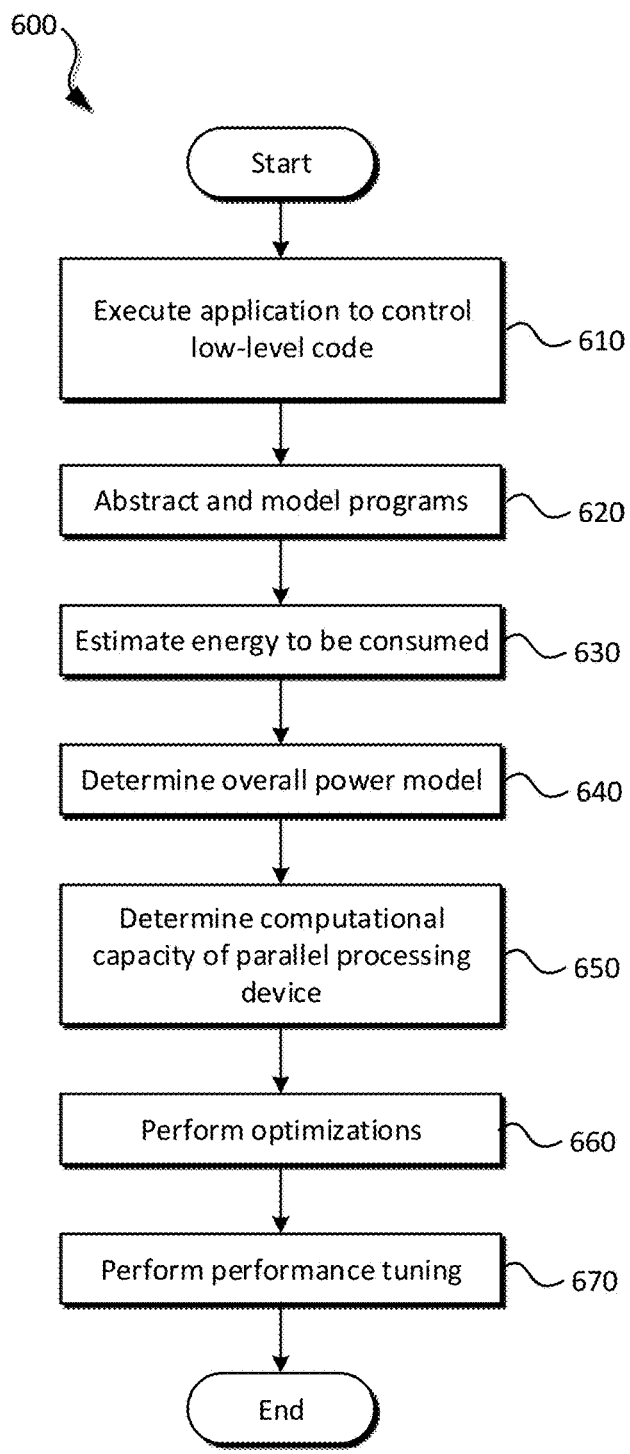
FIG. 6 is a flowchart of an embodiment of another energy estimation method.

FIG. 6 is a flowchart of an embodiment of a performance tuning method 600. In one embodiment, method 600 is implemented on a network element (e.g., network element 1000, shown below in FIG. 10) operating in a data center (e.g., data center 100, shown in FIG. 1) to perform performance tuning for the data center. For example, the method 600 may be implemented in a data center for a parallel processing platform comprising a plurality (e.g., 10, 16, 32, etc.) of processing elements (e.g., nodes) in the data center. The method 600 may be implemented prior to and/or while performing processes on big data to determine, according to the estimated energy consumption for processing big data (e.g., according to method 500), and a model of data flow in the data center (e.g., according to model 200), and individual characteristics of the processing elements in the data center, an optimal performance for the processing elements in the data center and may tune the performance of the processing elements accordingly. At step 610, an application (e.g., comprising one or more algorithms) is executed on the network element to control low-level code that is executing on devices in the data center (e.g., on computing resources 110). For example, a MapReduce algorithm may be used to control behaviors of low-level code execution on the network element. At step 620, programs operating on the devices in the data center are abstracted and modeled to allow for analyzing patterns and characteristics. For example, dependent on the particular application and algorithm, program behaviors may be identified with identical characters. These character patterns may be studied and analyzed to provide potential avenues for optimization.

At step 630, an estimation of an amount of energy that will be consumed while processing data is determined for a device in the data center. For example, an estimation of the amount of energy that will be consumed may be determined according to method 500, shown in FIG. 5. At step 640, an overall power model for all devices in the data center is determined according to an accumulation of the energy and/or power consumption determinations made at step 630 for each component. For example, in one embodiment, because power depends only on a number of operations performed as discussed previously, an energy consumption estimation of a single processing element according to step 630 may be multiplied by a number of processing elements in the data center to provide an energy consumption estimate for the entire data center. At step 650, a computational capacity of a parallel processing device is determined according to a micro-architecture of the parallel processing device, its programming language, and characteristics of computations executed on the parallel processing device. For data intensive processes, data flows are executed, in some embodiments, in a single instruction multiple data (SIMD) manner (e.g., in a streaming manner) on a processing element. The processing element executes the same instruction flow operating repeatedly on the identical structure. If the processing element's frequency and temperature does not vary, its throughput can be approximated as a constant. Therefore the computing capacity can be determined by the measure of the throughput. At step 660, optimizations are performed according to the power model determined in step 640 (e.g., by optimizing algorithms and/or coding strategies for processes that will be executed on devices in the data center). At step 670, power efficiency in the data center is increased by performing performance tuning actions (e.g., domain partitioning, load parallelization, dynamic frequency scaling, and/or workload scheduling) in response to estimations and results of actions of method 600.

In an embodiment, the computing performance and power efficiency analysis consists of a plurality of incremental steps. The result of each step is compared with original design objectives and then, according to the improvement demonstrated, a determination is made as to further refinement until a desired power performance and/or efficiency is achieved.

Figure 7:
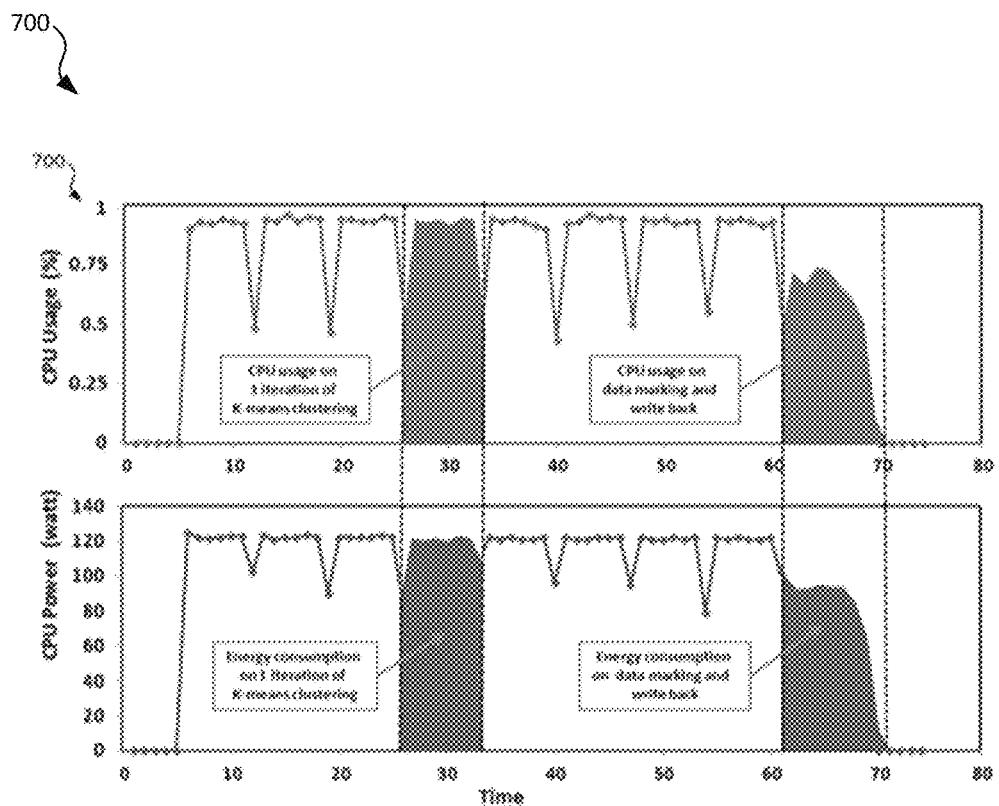
FIG. 7 is a chart showing power measurements for certain central processing unit usage levels during a k-means clustering operation.

FIG. 7 is a chart 700 showing power measurements for certain CPU usage levels during a K-means clustering operation. Chart 700 may be obtained, in one embodiment, through the power sensor array of data center 100, shown in FIG. 1, and by implementing a method of energy estimation (e.g., method 500 and/or method 600, shown above in FIG. 5 and FIG. 6, respectively). Chart 700 shows an amount of power utilized by a CPU over one iteration of a K-means clustering operation and during data marking and writeback, corresponding to an amount of CPU usage over the same computational periods. From chart 700, determinations may be made (e.g., energy usage and or a data to Watt ratio) for use in creating an energy model (e.g., according to methods 500 and/or 600, shown in FIG. 5 and FIG. 6, respectively).

K-means clustering is a flat clustering operation that provides an application that can be configured to match the complexity of real-world use-cases. For example, in one implementation of K-means clustering, given a total number of objectives n, and a number of clusters is k, let $C_1^{(0)}$, $C_2^{(0)} \ldots C_k^{(0)}$ represent the total k initial cluster centers (e.g., centroids). At the m-th iterative clustering operation, clusters' centroids are represented as $C_1^{(m)}, C_2^{(m)} \ldots C_k^{(m)}$. Further, let $S_i$ and $S_j$ represent cluster i and j, where i, j∈1, 2, ..., k, i≠j. At the m-th clustering operation, let $S_i^{(m)}$ and $S_j^{(m)}$ denote the set of objectives with the cluster centers $C_i^{(m)}$ and $C_j^{(m)}$. Each objective e is redistributed among the k clusters using a condition e∈$S_i^{(m)}$ when $\|e-C_i^{(m)}\| \le \|e-C_j^{(m)}\|$. For i∈1, 2, ..., k, new cluster centers $C_i^{(m+1)}$ are computed, where the sum of the squared distances from all objectives e in the new cluster center. The new cluster is given by $$C_i^{(m+1)} = \frac{1}{N_i} \sum_{e \in S_i^{(m)}} S_i^{(m)}(e), i = 1, 2, \ldots, k.$$

For i=1, 2, ..., k, repeat the K-means clustering steps until $C_i^{(m+1)} = C_i^{(m)}$. The K-means clustering operation is then converged and the operation is terminated.

In some embodiments of K-means clustering, a significant amount of computational time is spent on computing vector distances with one operational cost defined O(d). The reassignment step of the K-means clustering process computes kn distances, leading to an overall complexity of O(knd). In the recomputation step, each vector is added to a centroid once, resulting in a complexity of this step of O(nd). For a fixed number of iterations i, the overall complexity is therefore O(iknd). Thus, K-means clustering is linear in the factors of iterations i, number of clusters k, number of vectors n and dimensionality of the space d. In most cases, K-means clustering reaches either complete convergence or a clustering that is close to convergence in a relatively short period of time. In the latter case, a few data elements would switch cluster membership if further iterations were computed, but this has a small effect on the overall quality of the clustering. If k and d (the dimension) are fixed, K-means clustering may be performed in time $O(n^{dk+1} \log n)$, where n is the number of entities to be clustered.

In K-means clustering, a sparse metrics production is utilized to computer the vector distances according to low-level processing. As a result, the computing devices or processing elements executing operations on the data follow SIMD (e.g. multiply and plus operations repeatedly in a streaming way). When the processing element's frequency and temperature are invariant, and the number of executions in any time unit is fixed, the CPU power is modeled as a constant value. If each processing element in a data center has similarly unvarying characteristics, the processing element's energy consumption will only depend on the number of operations and the size of data it executes. The total energy used to complete the K-means clustering task is linear to the input data size, number of samples, iterations and number of clusters. When the linear coefficient in the above relations is found, a power cost for K-means clustering application on the target distributed platform may be determined.

Figure 8:
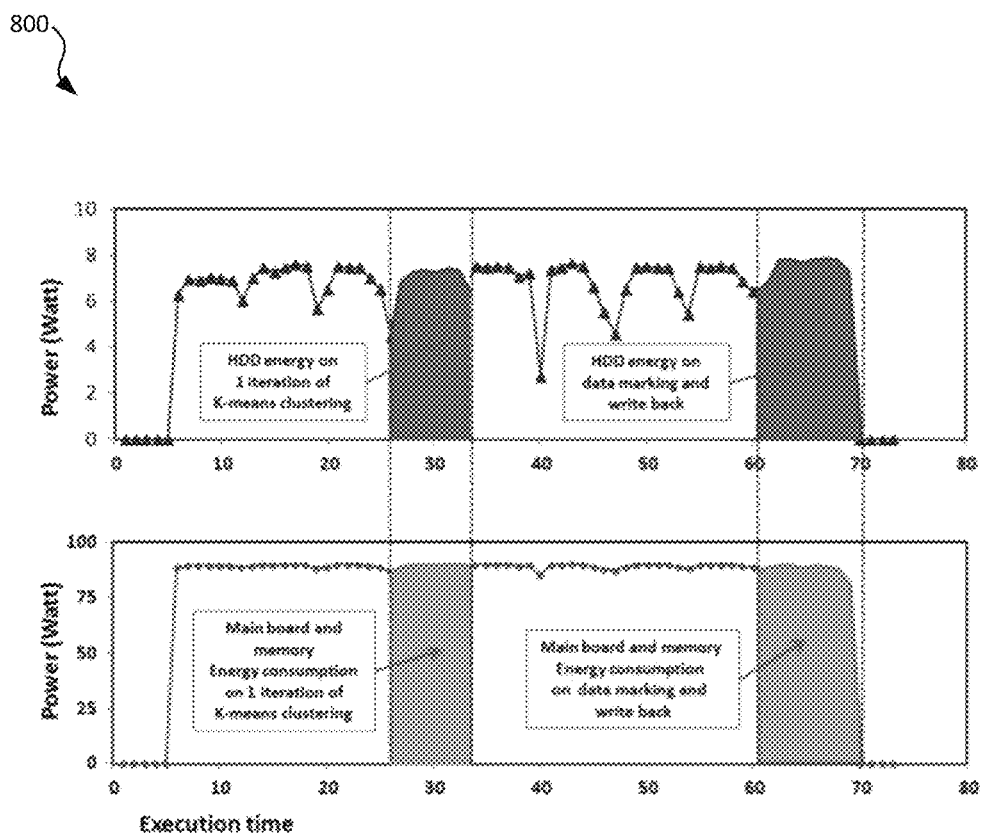
FIG. 8 is a chart showing power measurements for storage, main circuit board, and memory usage levels during a k-means clustering operation.

FIG. 8 is a chart 800 showing power measurements for storage (e.g., hard disk drive), main circuit board, and memory usage levels during a K-means clustering operation. Chart 800 may be obtained, in one embodiment, through the power sensor array of data center 100, shown in FIG. 1. Chart 800 shows an amount of power utilized for storage over one iteration of a K-means clustering operation and during data marking and write-back. Chart 800 also shows an amount of power utilized for operation of a main circuit board and memory over one iteration of the K-means clustering operation and during data marking and write-back. From chart 800, determination may be made (e.g., energy usage) for use in creating an energy model (e.g., according to methods 500 and/or 600, shown in FIG. 5 and FIG. 6, respectively).

Figure 9:
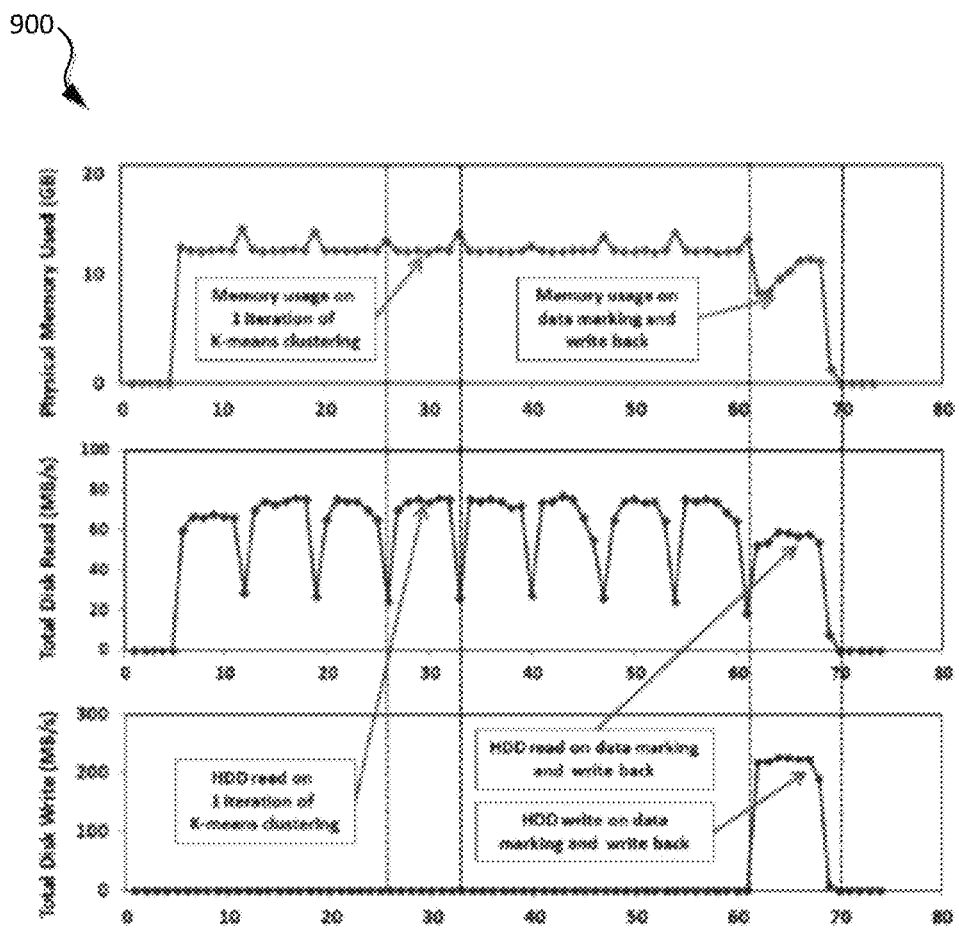
FIG. 9 is a chart showing data throughput during a k-means clustering operation.

FIG. 9 is a chart 900 showing data throughput during a K-means clustering operation. Chart 900 demonstrates a data to watt ratio for various processes occurring during a K-means clustering operation. The data to Watt ratio indicates an amount of data that is processed for a given amount of power consumed (e.g., a number of megabytes of data processed per Watt of power consumed). In one example, for a given function being performed by a processing element (e.g., a computing resource 110, shown in FIG. 1) a plurality of subcomponents of that processing element are involved (e.g., a CPU such as computing component 120, a main board that includes functions such as network component 140, and a hard disk drive such as storage component 130). Each of the subcomponents consumes a certain amount of power in processing data, as shown in chart 900. By tracking power usage of these subcomponents through performing a process on data using the subcomponents, a data to Watt ratio for the subcomponents individually, and the processing element in which the subcomponents reside, may be determined. Determining a data to Watt ratio according to a chart, such as chart 900, is one manner of determining a data to Watt ratio for use according to the present disclosure, for example, in step 520 of method 500, shown in FIG. 5.

Figure 10:
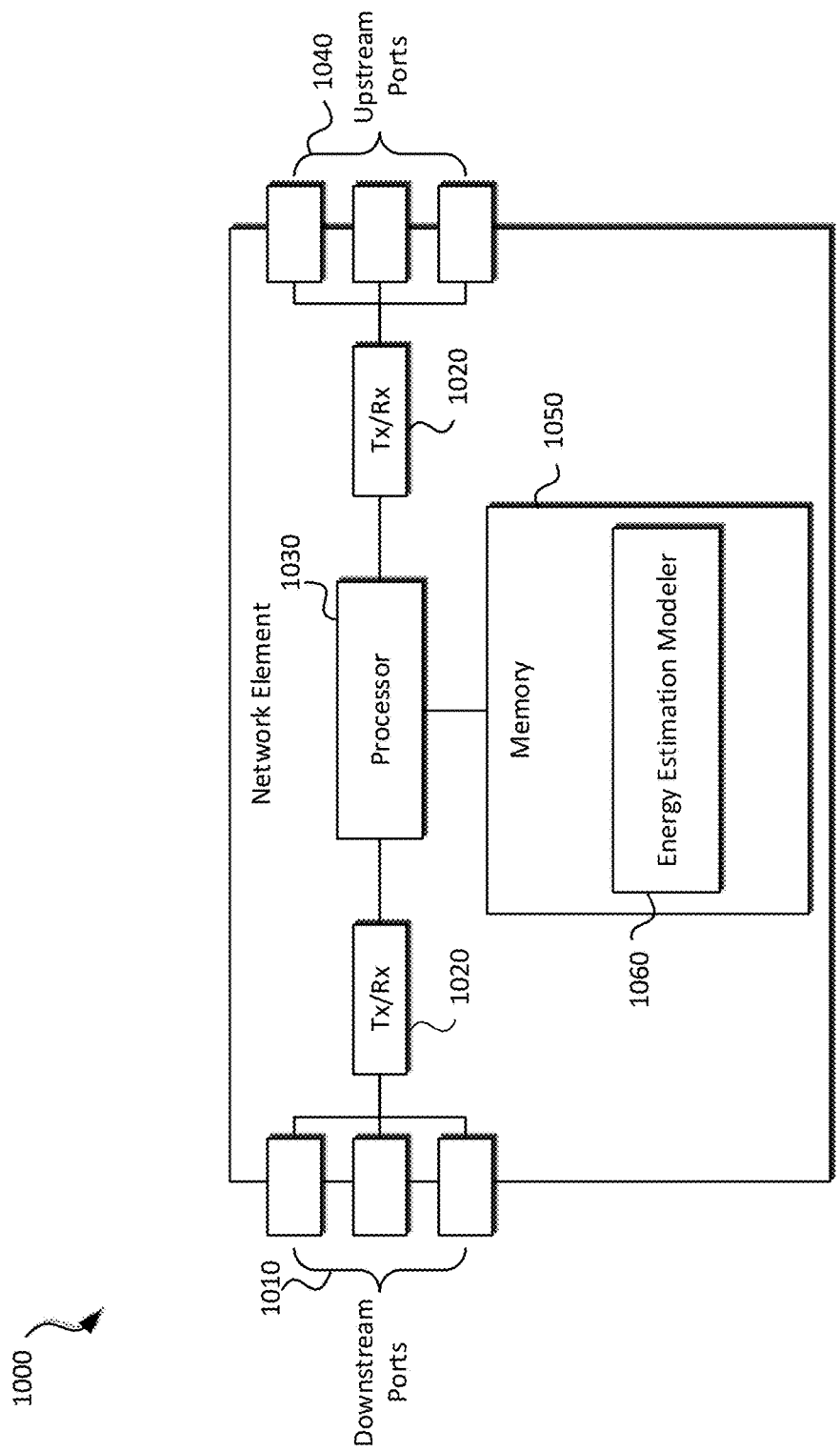
FIG. 10 is a schematic diagram of an embodiment of a network element for energy modeling in a data center.

At least some of the features/methods described in this disclosure may be implemented in a network element (NE) 1000, shown in FIG. 10. For instance, the features/methods of this disclosure may be implemented using hardware, firmware, and/or software installed to run on hardware. The network element 1000 may be any device (e.g., an access point, an access point station, a router, a switch, a gateway, a bridge, a server, a client, a user-equipment, a mobile communications device, etc.) that transports data through a network, system, and/or domain and/or any device that provides services to other devices in a network or performs computational functions. Moreover, the terms network "element," network "node," network "component," network "module," and/or similar terms may be interchangeably used to generally describe a network device and do not have a particular or special meaning unless otherwise specifically stated and/or claimed within the disclosure. In one embodiment, the network element 1000 may be an apparatus configured to provide energy estimation and/or modeling as described in method 500 and/or method 600.

The network element 1000 may comprise one or more downstream ports 1010 coupled to a transceiver (Tx/Rx) 1020, which may be transmitters, receivers, or combinations thereof. The Tx/Rx 1020 may transmit and/or receive frames from other network nodes via the downstream ports 1010. Similarly, the network element 1000 may comprise another Tx/Rx 1020 coupled to a plurality of upstream ports 1040, wherein the Tx/Rx 1020 may transmit and/or receive frames from other nodes via the upstream ports 1040. The downstream ports 1010 and/or the upstream ports 1040 may include electrical and/or optical transmitting and/or receiving components. In another embodiment, the network element 1000 may comprise one or more antennas (not shown) coupled to the Tx/Rx 1020. The Tx/Rx 1020 may transmit and/or receive data (e.g., packets) from other network elements wirelessly via one or more antennas.

A processor 1030 may be coupled to the Tx/Rx 1020 and may be configured to process the frames and/or determine to which nodes to send (e.g., transmit) the packets. In an embodiment, the processor 1030 may comprise one or more multi-core processors and/or memory modules 1050, which may function as data stores, buffers, etc. The processor 1030 may be implemented as a general processor or may be part of one or more application specific integrated circuits (ASICs), field-programmable gate arrays (FPGAs), and/or digital signal processors (DSPs). Although illustrated as a single processor, the processor 1030 is not so limited and may comprise multiple processors. The processor 1030 may be configured to communicate and/or process multi-destination frames.

FIG. 10 also illustrates that a memory module 1050 may be coupled to the processor 1030 and may be a non-transitory medium configured to store various types of data. Memory module 1050 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 1050 may be used to house the instructions for carrying out the various embodiments described herein. In one embodiment, memory module 1050 may comprise an energy estimation modeler 1060 that may be implemented on processor 1030 and configured to estimate an amount of energy used by a processing element according to method 500, discussed above and shown in FIG. 5.

It is understood that by programming and/or loading executable instructions onto the network element 1000, at least one of the processor 1030 and/or the memory 1050 are changed, transforming the network element 1000 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a receiver configured to receive a plurality of power measurements from a plurality of power measurement instruments; and
   a processor with an energy measurement and estimation daemon coupled to the receiver and configured to:
   determine an average power usage by a processing element in a data center by determining a summation of the plurality of power measurements divided by a total number of the power measurements;
   determine a data to Watt ratio that indicates a power cost for the processing element to process an amount of data;
   determine an estimated execution time in a performance run for processing the amount of data by the processing element;
   determine an estimated energy consumption that indicates an amount of energy to be used by the processing element to process the amount of data;
   determine a computational capacity of a parallel processing device by repeatedly executing a same instruction flow on the parallel processing device and determining that a throughput of the parallel processing device may be approximated as constant; and
   tune the processor based on the average power usage, the data to Watt ratio, the estimated execution time, the estimated energy consumption, and the computational capacity as determined to increase a power efficiency level of the processor.

2. The apparatus of claim 1, wherein the plurality of power measurements are received from the plurality of power measurement instruments located at a device level of a processing device in the data center, and wherein the processing device includes one or more of a computing component, a storage component, and a network component employed in the performance run.

3. The apparatus of claim 1, wherein the plurality of power measurements are received from the plurality of power measurement instruments located at a circuit board level of a processing device in the data center.

4. The apparatus of claim 1, wherein the plurality of power measurements are received from the plurality of power measurement instruments located at an integrated circuit level of a processing device in the data center.

5. The apparatus of claim 1, wherein the data to Watt ratio is determined by dividing a data throughput of the processing element over a given time period by an amount of power used by the processing element over the given time period.

6. The apparatus of claim 1, wherein the estimated execution time is determined by dividing a total quantity of data to be processed by the processing element by a maximum data throughput level of the processing element.

7. The apparatus of claim 1, wherein the estimated energy consumption is determined by multiplying the estimated execution time by an average amount of power used that is determined according to the summation of the plurality of power measurements, wherein the apparatus is disposed within a data center system comprising a plurality of additional apparatuses, wherein the estimated energy consumption for each of the additional apparatuses is determined in a manner similar to the apparatus, and wherein the estimated energy consumption for the apparatus and the estimated energy consumption for the additional apparatuses are aggregated and recorded by the data center.

8. A method for tuning performance of a processing element for handling a data flow, comprising:
controlling a behavior of low-level code of a program executing on the processing element;
abstracting and modeling the behavior of the program for analysis and study;
determining an estimate of energy used by the processing element in performing computational tasks, the estimate of energy based on an average power usage for the processing element, the average power usage based on a sum of power measurements divided by a total number of power measurements;
determining an overall power model for a multiprocessing platform;
determining computational capacity of a parallel processing device by repeatedly executing a same instruction flow on the parallel processing device and determining that a throughput of the parallel processing device may be approximated as constant;
optimizing coding strategies according to the overall power model; and
tuning, using a processor at least partially implemented in hardware, the processing element based on the estimate of energy used, the overall power model, and the computational capacity of the parallel processing device as determined to increase a power efficiency level of the processing element.

9. The method of claim 8, wherein determining the estimate of energy used by the processing element in performing computational tasks comprises multiplying an estimated execution time for executing the computational tasks by an average amount of power expected to be used in performing the computational tasks.

10. The method of claim 9, wherein the average amount of power expected to be used in performing the computational tasks is determined according to an amount of power used by the processing element while operating in a steady-state.

11. The method of claim 8, wherein the computational capacity of the parallel processing device is determined according to micro-processors of the parallel processing device, a programming language used in the parallel processing device, and characteristics of a computation performed on the parallel processing device.

12. The method of claim 8, wherein tuning the processing element to increase a power efficiency level comprises at least one of domain partitioning, load parallelization, dynamic frequency scaling, or workload scheduling.

13. The method of claim 8, wherein the overall power model is determined according to an accumulation of power measurements for each component in the processing element.

14. The method of claim 8, wherein the method operates in both a time domain and a hardware domain, wherein a frequency of each component is varied, wherein computing capacity and power consumption vary according to the frequency of each component, and wherein the frequency of each component is varied to tune the processing element to satisfy a performance requirement.

15. The method of claim 8, wherein the method facilitates prediction of power usage.

16. The method of claim 8, wherein the method comprises an energy model that is based on workload characteristics of the processing element.

17. A method of modeling energy usage in a processing element, comprising:
performing a plurality of power measurements of a plurality of components of the processing element located in a data center;
determining an average power usage according to the plurality of power measurements divided by a total number of the power measurements;
determining an estimated execution time for the processing element performing at least one action on a data flow;
determining an estimated value of energy consumption according to the average power usage and the estimated execution time;
determining computational capacity of a parallel processing device by repeatedly executing a same instruction flow on the parallel processing device and determining that a throughput of the parallel processing device may be approximated as constant; and
tuning the processing element based on the average power usage, the estimated execution time, the estimated value of energy consumption, and the computational capacity as determined to increase a power efficiency level of the processing element.

18. The method of claim 17, wherein determining the average power usage comprises determining a power usage of the processing element when operating in a steady-state.

19. The method of claim 17, wherein determining the estimated execution time comprises dividing a workload for which the processing element is to perform the at least one action divided by a maximum computation throughput value for the processing element.

20. The method of claim 17, wherein determining the estimated value of energy consumption comprises multiplying the average power usage by the estimated execution time.

* * * * *